(12) United States Patent
Gehlen et al.

(10) Patent No.: US 7,715,596 B2
(45) Date of Patent: May 11, 2010

(54) METHOD FOR CONTROLLING PHOTOGRAPHS OF PEOPLE

(75) Inventors: Stefan Gehlen, Bochum (DE); Michael Brauckmann, Witten (DE); Martin Werner, Hemer (DE)

(73) Assignee: Viisage Technology AG, Bochum (DE)

( * ) Notice: Subject to any disclaimer, the term of this patent is extended or adjusted under 35 U.S.C. 154(b) by 869 days.

(21) Appl. No.: 10/532,548

(22) PCT Filed: Oct. 15, 2003

(86) PCT No.: PCT/EP03/11429

§ 371 (c)(1),
(2), (4) Date: Sep. 9, 2005

(87) PCT Pub. No.: WO2004/038646

PCT Pub. Date: May 6, 2004

(65) Prior Publication Data

US 2006/0153429 A1 Jul. 13, 2006

(30) Foreign Application Priority Data

Oct. 24, 2002 (EP) .................................. 02023745

(51) Int. Cl.
*G06K 9/00* (2006.01)
(52) U.S. Cl. .................... 382/118; 382/112; 382/274
(58) Field of Classification Search .................. 382/118
See application file for complete search history.

(56) References Cited

U.S. PATENT DOCUMENTS 4,975,969 A * 12/1990 Tal ............................ 382/116
5,148,477 A * 9/1992 Neely et al. ................. 382/107
5,163,094 A * 11/1992 Prokoski et al. ............. 382/118
5,450,504 A * 9/1995 Calia ......................... 382/118
5,625,704 A * 4/1997 Prasad ........................ 382/118
5,629,752 A * 5/1997 Kinjo .......................... 355/35
5,805,745 A * 9/1998 Graf ............................ 382/291
5,878,156 A * 3/1999 Okumura .................... 382/118
5,963,656 A   10/1999 Bolle et al.
5,995,639 A * 11/1999 Kado et al. ................. 382/118
6,151,403 A * 11/2000 Luo ........................... 382/117
6,252,976 B1 * 6/2001 Schildkraut et al. ......... 382/117

(Continued)

FOREIGN PATENT DOCUMENTS

EP        0984386        3/2000

(Continued)

OTHER PUBLICATIONS

Tele Connect Videosystemen: Frequently Asked Questions, http://www.teleconnect.nl/faces-pages/faces-techbesalsface-ut-faq.pdf, Jul. 23, 2002, pp. 1-6, Netherlands.

*Primary Examiner*—Sath V Perungavoor
(74) *Attorney, Agent, or Firm*—IP Strategies

(57) ABSTRACT

It is provided a method for verifying digitized images of persons and apparatuses for performing the method. The method is particularly usable for verifying the suitability of an image of a person for identification of the person. The method comprises the steps: segmenting the image of a person in a background area and a head or face area, analyzing the head or face area, to detect at least one characteristic value, comparing the at least one characteristic value with at least one predetermined threshold value.

11 Claims, 1 Drawing Sheet

U.S. PATENT DOCUMENTS

| | | | |
|---|---|---|---|
| 6,272,231 B1 * | 8/2001 | Maurer et al. | 382/103 |
| 6,389,181 B2 * | 5/2002 | Shaffer et al. | 382/305 |
| 6,396,963 B2 * | 5/2002 | Shaffer et al. | 382/305 |
| 6,529,630 B1 * | 3/2003 | Kinjo | 382/190 |
| 6,658,148 B1 * | 12/2003 | Fung et al. | 382/209 |
| 7,039,222 B2 * | 5/2006 | Simon et al. | 382/118 |
| 7,130,453 B2 * | 10/2006 | Kondo et al. | 382/117 |
| 7,177,450 B2 * | 2/2007 | Tajima | 382/118 |
| 7,190,844 B2 * | 3/2007 | Kobayashi et al. | 382/274 |
| 7,315,630 B2 * | 1/2008 | Steinberg et al. | 382/118 |
| 7,317,815 B2 * | 1/2008 | Steinberg et al. | 382/118 |
| 7,327,891 B2 * | 2/2008 | Covell et al. | 382/224 |
| 7,440,593 B1 * | 10/2008 | Steinberg et al. | 382/118 |
| 7,539,342 B2 * | 5/2009 | Tabata et al. | 382/167 |
| 2001/0046330 A1 | 11/2001 | Shaffer et al. | |
| 2002/0136435 A1 * | 9/2002 | Prokoski | 382/118 |
| 2002/0143718 A1 * | 10/2002 | Ali et al. | 706/13 |
| 2003/0012414 A1 * | 1/2003 | Luo | 382/118 |
| 2003/0048950 A1 * | 3/2003 | Savakis et al. | 382/225 |
| 2003/0071908 A1 * | 4/2003 | Sannoh et al. | 348/345 |
| 2003/0095197 A1 * | 5/2003 | Wheeler et al. | 348/241 |
| 2003/0151674 A1 * | 8/2003 | Lin | 348/222.1 |
| 2003/0161006 A1 * | 8/2003 | Kobayashi et al. | 358/2.1 |

FOREIGN PATENT DOCUMENTS

| | | |
|---|---|---|
| JP | 04264985 | 9/1992 |
| WO | WO-0235453 | 5/2002 |

* cited by examiner

METHOD FOR CONTROLLING PHOTOGRAPHS OF PEOPLE

FIELD OF INVENTION

The invention relates to a method for verifying images of persons, in particular, portraits. Predetermined quality standards for an image of a person (a portrait) are parameterized by threshold values and by comparison of the detected characteristic values of the image with the threshold values it is verified whether the quality standards are observed during performance of the method. The method allows for objectively verifying according to predetermined criteria whether an image of a person is appropriate for person identification. Furthermore, there are provided apparatuses for performing the method.

BACKGROUND OF THE INVENTION

The oldest and still most prevalent method for recognizing or verifying respectively, the identity of a person is face recognition.

In difference to the comparison of fingerprints or signatures or a genetic comparison ("genetic fingerprint") the visual comparison employed in face recognition can be readily and quickly be performed by the unskilled person without any technical means.

Identity verification by face recognition is always performed by a comparison of two images: (1) a reference image that is either available as a real portrait, e.g., as a photo on an identity card, a search photo or as a different portrait, or as a physical or imaginary image reconstructed from the memory or a description, e.g., a photofit picture, with (2) a comparative image to be compared with the reference image, whereupon the identity is asserted or not depending on the grade of correspondence.

Such kinds of identity verification are usually still performed by persons rather than being executed automatically, as, e.g. in a traffic check or passport control in which cases the reference image is a photo on an identity card and the comparative image is an imaginary image reconstructed by the controlling person from the visual impression of the face of the checked person. Methods of automatic image processing are very laborious due to the huge amount of image information to be processed and also error-prone, if the quality of the used images is insufficient. Features that are not considered as quality features may also play some role. For example, the posture of the head has a huge impact on the significance of the outcome of an automatic comparison of images: according to the art front views qualify much better than other postures as, e.g., the half-side profile of a person's face.

Either identity verification is performed visually be a person or automatically, the quality of the used portraits is a crucial criterion for the significance of an identity verification. For the quality not only the reproduction qualities as the resolution, sharpness, contrast, brightness, staining etc. of the image but also the mode of presentation of the displayed face is of importance. Particularly, for automatic methods portraits of reduced quality represent almost unsolvable problems in successfully comparing images.

Identity verification of persons by comparison of fingerprints, signatures, etc. is to an increasing degree performed with the assistance of semi-automatic or automatic methods. Again, the quality of the used fingerprints or signatures, respectively, is crucial. With respect to signatures the U.S. Pat No. 6,363,162 A, e.g., describes a system and method for verifying the quality of signatures wherein a binary image of the document carrying the signature is generated, the background is eliminated and subsequently the signature is examined and evaluated. However, this method is of no or only very limited use for the application to portraits due to the higher complexity of such images.

In fact, methods and systems for automatically verifying and, if need be, correcting the contrast, color and brightness of images are known in typography and photography. These are, however, always based on an analysis of either the entire image or predetermined image areas. They are not appropriate for the extraction of structures or even identification of individual objects within the image.

A further problem lies in the fact that quality standards for portraits are only vaguely defined and up to now are only verified by visual inspection. The general appearance of a German passport photograph, e.g., is defined by some criteria and examples. However, whether a photograph is acceptable for a passport or not is decided by one or more executives/appointees.

A more precise definition of quality standards is, however, meaningful only, if observation thereof can be verified objectively. An objective inspection method for portraits including verification whether an image actually observes predetermined criteria or not is, however, not available as yet.

BRIEF SUMMARY OF THE INVENTION

It is an object of the invention to overcome the above-described disadvantages and uncertainties in quality verification of images of persons and, in particular, portraits.

This object is solved according to the invention by providing methods and apparatuses or systems, respectively, by means of which predetermined quality standards (quality criteria) for images of persons can objectively be verified.

This object is specifically solved by the method described herein.

Another aspect of the invention is to modify, if possible, images that do not observed the criteria such that the respective modified images of persons observe the criteria.

The method for verification of digitized images of persons according to the invention comprises the steps of: segmenting the image of a person in a background area and a head or face area, analyzing the head or face area to detect at least one characteristic value, comparing the at least one characteristic value with at least one predetermined threshold value.

The threshold values represent quality standards, quality criteria, and depending on the kind of criterion a respective characteristic value is determined to observe the respective quality criterion, if it is larger than the corresponding threshold, smaller than the corresponding threshold or lies between a corresponding lower threshold and a corresponding upper threshold.

With respect to the resolution and sharpness of the image, e.g., lower threshold values are appropriate, with respect to the size (amount of data) and brightness of the image lower and upper threshold values are appropriate, respectively, and with respect to staining or other defects of the image (e.g., locally damaged or missing image data) upper threshold values are appropriate.

Images of persons include, e.g., a live image recorded by a camera that has to fulfill the same quality standards for identification methods as a passport photograph etc. and is to be verified with respect to these quality standards. If the quality of the live image does not observe the quality standards the recording process is to be stopped or repeated, respectively. A typical application is, e.g., the automatic comparison of images in passport control during which the live recording of the person is compared with the photograph on the passport.

Since the hairs of a person represent one of the features that are manipulated most easily, in many cases it is appropriate to not use the entire displayed head but rather the face (or at least placing emphasis on the face rather than the hairs) in identification of persons by comparison of images. The ears are considered as being part of the face. In this case, the image of a person or the portrait, respectively, can be segmented directly in a face area and a background area (residual part of the image).

A different weighting of different regions of the head can be achieved by segmenting the image of a person or the portrait, respectively, in a background area and a head area and, in the simplest case, by assigning different weight factors to different regions of the head. In many cases, complementary non-linear weighting of these regions is preferred.

One of the simplest segmentation methods is based on discrimination by color and a predetermined color spectrum for the face area and/or the background area is assumed. Particularly, assuming a predetermined color spectrum for the face area is in many cases suitable, since, e.g., passport photographs are usually taken in front of a monochrome background. The segmentation step may be performed by at first segmenting the image of a person or the portrait, respectively, and by subsequently further segmenting the head area in a face region and the region around the face (e.g., including hairs, the cervix etc.).

Another simple segmentation method is based on the fact that images of a person or portraits, respectively, in most cases, show a diffuse background or at least a background that is much less sharper than the head/face area. In comparison to the sharper image areas the blurred area is characterized by a lower local brightness variation and less abrupt color changes.

Complementary or in addition to these simple segmentation methods, an object recognition method may be employed in segmentation, e.g., the graph matching method that is well-known in the art (see the German patent 44 06 020, Verfahren zur automatisierten Erkennung von Objekten) or advanced methods as the hierarchic image model matching HGM (see the European patent application No. 01 118 536.0). Other object recognition methods, e.g., are based on an eigenvalue ansatz as the method known as the eigen-faces method (M. Turk, A. Pentland: "Eigenfaces for recognition", Journal of Cognitive Neuroscience, 3(1), pp. 71-86, 1991) or are based on the analysis of local object features ("Local Feature Analysis", J. S. Penev, J. J. Atick, Local feature analysis: A general statistical theory for object representation, Network: Computation in neural systems, 7, pp. 477-500).

In a preferred embodiment of the method according to the invention analyzing the head or face area comprises detecting at least one geometric feature of the head or face area. 'Geometric feature' is to be understood in the broadest meaning: Geometric features comprise, e.g., the portion of the area of the entire image covered by the head/face area, the position or spatial orientation of the head or face area within the image, the shape of the head/face, the width/height of the head/face area measured by the number of pixels, etc. It has been determined empirically that at least a resolution of 100 pixels in the horizontal direction and of 125 pixels in the vertical direction is required for a face to be verified reasonably in the identification of a person by some method of comparing images.

In another preferred embodiment of the method according to the invention analyzing the head/face area comprises detecting at least one reproduction feature of the head/face area. These reproduction features, which are heavily influenced by the conditions of taking the image, include contrast, color distribution, sharpness of the image, brightness, irradiation, etc. Another reproduction feature is the "grade of staining" that is of particular importance, if the digitized portrait or image of a person, respectively, has been reproduced from a stained or damaged original copy.

In a particularly preferred and advantageous embodiment analyzing the head or face area comprises localizing of sub-regions (e.g., eyes, mouth, nose) of the head or face area. Localizing or extracting of such sub-regions may, e.g., be performed by segmentation methods. At this it can be detected, amongst others, which parts of the face are displayed in the image (or recognizable) and which parts are not, whether eyes or mouth are closed or open, whether pigments or scars are present, whether eyeglasses or face piercing or earrings are present etc. Preferably, the localized search regions are not only detected, i.e. presence or absence is determined, but also separately examined. One feature that can be detected and that is of particular importance is the eye color. However, other features of the eyes, the nose, the mouth, in particular, the shapes thereof can be examined and characteristic values for the shapes, colors etc. can be determined.

According to an advantageous embodiment of the above mentioned methods as a further step—preferably as the first step—the image of a person/portrait is examined with respect to criteria relevant for the entire image and the corresponding characteristic values are determined. These global criteria include: size, resolution, gray values, brightness, contrast, color distribution, color balance, texture etc. Furthermore, subsequent to the segmentation an analysis of not only the foreground (i.e. the head or face area) but also of the background can be carried out. Again features as the portion of the area covered, resolution, brightness, contrast, color, color distribution, color balance, texture etc. can be examined.

If at least one of the quality standards or a predetermined number of criteria and/or a combination thereof is not fulfilled during the above described methods by an image of a person/portrait, it is determined that the image does not observe the predetermined quality standards and therefore is not suitable for person recognition and, in particular, automatic person recognition.

The quality standards can be classified in "soft" and "hard" criteria. "Hard" criteria cannot be amended without arbitrary assumptions. For example, red eyes that often are present in photographs taken with the help of flash lights usually cannot be turned into green, blue etc. without any further information. If, however, further information is available, such a correction might be tolerable. In the case of "soft" criteria image corrections can be done based on reasonable assumptions such that the corresponding corrected image observes the predetermined quality standards. These criteria include, e.g., color and where appropriate brightness and contrast also. Although a high image resolution, in general, is desired a too high resolution might slow the above-described methods for image processing down in a way that image correction including a reduction of the resolution without crucial loss of information can be advantageous.

As explained above under certain circumstances it might be possible to modify an image that was negatively evaluated in the first instance by image correction means such that the modified image observes the quality standards. Therefore, the method comprises according to a preferred embodiment a step in that it is determined whether a negatively evaluated image could fulfill the predetermined quality criteria after image correction.

In practice, this method can be carried out by determining whether the negatively evaluated image would not observe the predetermined quality standards even after having been subject to image correction. If the result of this determination is negative, it is assumed that after performing image correction the image might observe the predetermined quality standards.

As mentioned at several places the invention furthermore provides a correction method for digitized images of persons and, in particular, portraits, and particularly, for such images by that at least one quality criterion during one of the verification methods according to the invention is not fulfilled, wherein the correction method comprises one of or in suitable combination at least some of the following steps: correcting at least one image reproduction feature in the entire image area/head or face area/background area, and correction of at least one geometric feature of a head or face area displayed in the image of a person or the portrait.

The invention furthermore provides a data processing means configured to execute the inventive verification method or the correction method, respectively, or to execute both methods. The data processing means may be, e.g., a CPU that reads digitized image data from a memory, processes the image data and outputs the processed image data or the results of the verification or correction methods, respectively.

Furthermore, the invention provides a system for quality verification and correction of images of persons comprising a storage means for storing digitized image data and at least one of the data processing means according to the invention.

The means for storing digitized image data can be provided locally at the same place as the data processing means or separated from the latter, e.g., as a remote data base with read option and possibly write option allowing access via the Internet.

The data to be examined or reference image data or both kinds of image data can be stored in the storage means.

In a preferred embodiment the system according to the invention furthermore comprises an apparatus for generating digitized image data, e.g., a scanner or a digital camera. The generated image data can be stored in the above-described storage means and can be examined with respect to their features (quality) concurrently or when desired.

In another preferred embodiment the system comprises a display device for displaying whether a verified image or a corrected image observes predetermined quality standards.

BRIEF DESCRIPTION OF THE DRAWING

In the following the nature of the invention and preferred methods for performing the method according to the invention will be described with reference to the accompanying drawing.

DETAILED DESCRIPTION OF THE INVENTION

Figure 1:
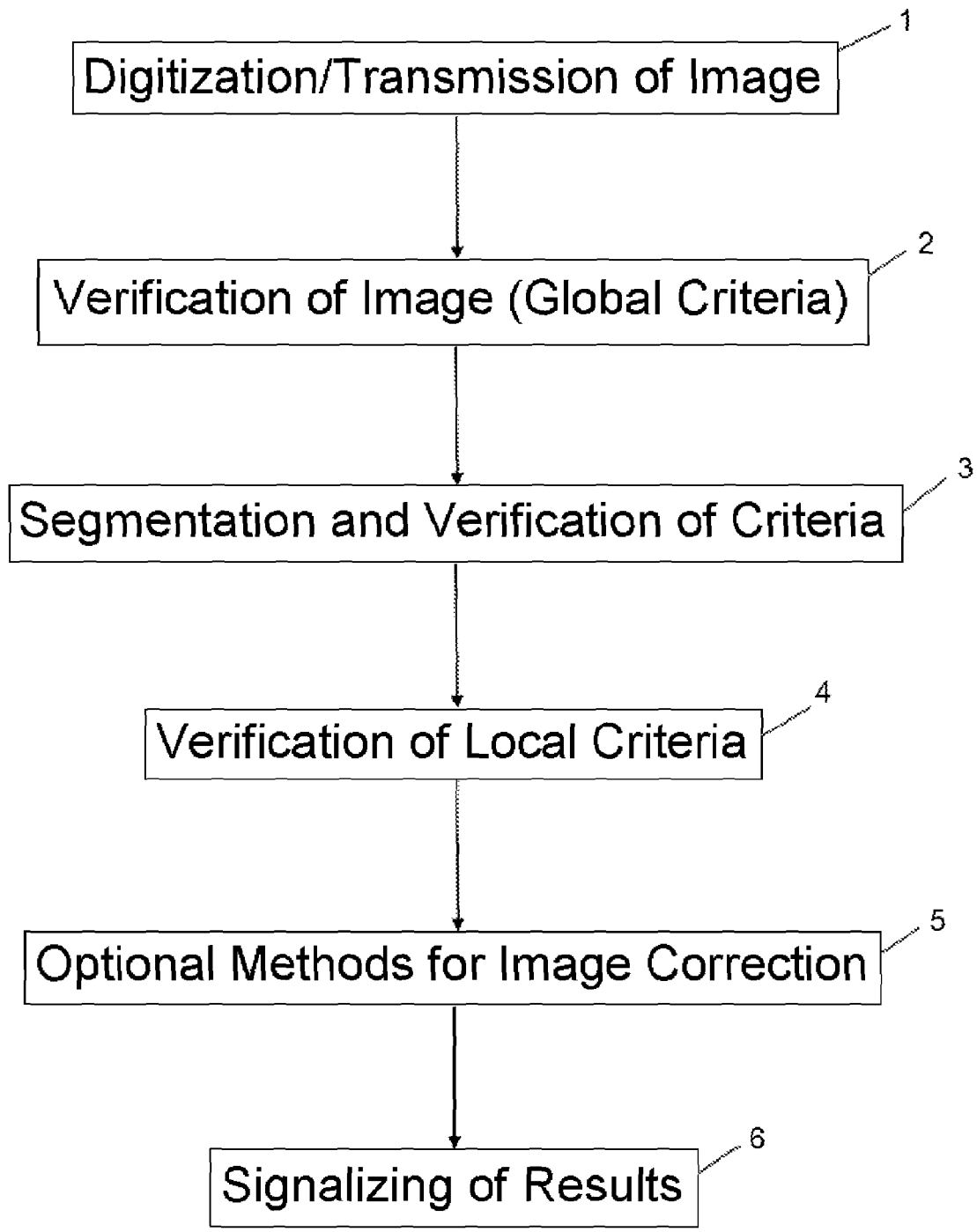
FIG. 1 is a schematic flow chart of a particularly preferred embodiment of the method according to the invention.

The flow chart shown in FIG. 1 represents the operation scheme of a quality verification of an image of a person, in this case, of a portrait, that is performed according to the principles of the present invention.

In this flow chart the reference sign 1 indicates digitization/transmission of an image, the reference sign 2 indicates verification of an image with respect to global criteria (i.e. criteria that apply to the entire image), the reference sign 3 indicates segmentation (locating the head/face) and verification of criteria in the head/face area and where appropriate in the background area also, the reference sign 4 indicates verification of local criteria in the face area, the reference sign 5 indicates (optional) methods for image correction and the reference sign 6 indicates signalizing of the results and/or the data export.

It should be noted that the sequence is shown in the figure for example and not all of the details are mandatory. For example, some of the correction methods can be already performed prior to block 5.

The digitization/transmission of images indicated in block 1 comprises generation of a digitized image (if need be) and reading of a digitized image in a computational unit that executes the steps of the subsequent blocks 2-6.

If the image to be examined (image data) is not available in digitized form, it can be converted to a digitized imaged by means of a scanner. If a particular image format is desired for the performance of the method, prior to or subsequent to the read operation some format conversion can be carried out. Common formats for digital image data are, e.g., JPG, JPEG, TIFF, BMP, that are well-known in the art and have not to be described in detail. It goes without saying that transmission of the image data can be carried out via the Internet.

In step 2 the read image is examined with respect to global criteria.

Examination includes:
verification of the compression factor in the case of electronically transmitted images
verification of the size/resolution of the image
verification of the sharpness of the image
verification (and if need be correction) of the global brightness of the image
verification of (and if need be correction) of a gray value or a illumination gradient, respectively
verification (and if need be correction) of the contrast of the image
verification of the of the highlight areas of the image
verification of the color distribution (and if need be correction of the color balance)
verification whether staining effects or other perturbations (e.g., stamps) are present in the image
(gamma correction)

With respect to the steps above set in brackets it is stressed that the image correction specified in block 5 with respect to the global features of the image reproduction may advantageously be performed in block 2 where appropriate.

In the following, these individual steps will be described in more detail.

The compression factor, e.g., can be detected from the file description in the case of electronically transmitted JPEG-images. The thus detected compression factor is compared with predetermined thresholds. If it falls below the threshold, a negative verification result is obtained. In face recognition, e.g., compression factors above 12.5 to 1 have been proven to be problematic for JPEG-based methods.

Then, the portrait that is digitized by means of a scanner or that is already available as a digital image is analyzed with respect to the resolution of the image. The resolutions of the image in the x- and y-directions are compared with predetermined thresholds. In the case of person recognition, a minimum resolution of 100 pixels (x-direction, width of the image) and 125 pixels (y-direction, height of the image) have been approved being sufficient for the head/face area.

The sharpness of the image is preferably judged by the high frequency spectral contributions to the image. An estimator for the noise process may be employed, additionally, to discriminate between signal and noise that also contributes to high frequency portions and thus, the noise spectrum can be subtracted. The spectral portions that are relevant for the face recognition can be determined by calculation of the corresponding spatial frequencies. Suitable threshold values for the expected value and the variance of the relevant spectral portions can be derived from reference image data. By these threshold values the grade of the sharpness of the image with respect to the problem of "face recognition" can be determined.

The global brightness of the image is given by the mean value of the gray values of the image. By comparison of the average gray value with an upper and a lower threshold it can be determined whether the brightness of a portrait lies within a predetermined tolerance.

The contrast of an image is given by the ratio of brightness levels of neighbored area elements of an image. For verifying whether an image shows a sufficient contrast in a simplified way the variance of the image or of regions of the image, respectively, or the histogram of the entire image or of one or more sub-regions can be determined. A lower threshold for a sufficient contrast can be determined by a statistical analysis of an appropriate image data set.

Highlights, i.e. reflection of the surface of an object due to an excessive illumination or a spot light, lead to local atypical irradiation. Irradiation can be detected in the image when global saturation values are reached or by local brightness discontinuities. Besides the brightness analysis advantageously area and shape measurements of the irradiated area(s) are performed in order to minimize errors.

To verify the color distribution and color balance the available color information, which is usually present in an RGB representation, is first of all transformed to a suitable color space (e.g., HSV: "Hue-Saturation-Value", or HSI: "Hue-Saturation-lntensity"). Then, the statistics of the image data are evaluated. Conveniently, the information in the area of the face only should be used for this, since the color and the structure of the background are usually unknown. However, the case in that a background is specified and essentially the same over the entire data range is to be regarded as an exception.

After evaluation of the statistics the results can be compared with model parameters. Comparison is carried out either directly, e.g., by comparing histograms (e.g., minimizing the cross entropy) or by descriptive parameters (in the simplest case, e.g., by determining the mean value and variance and comparing with the corresponding model parameters; where appropriate some transformation of the distributions can follow in order to correct for deviations).

Staining effects or other perturbations may influence the image quality in different ways. Staining spread over broad areas may, e.g., lead to a color balance that cannot be corrected. Smaller perturbations are detected by an analysis of the residuals between the original and the median-filtered image. Alternatively or in addition, morphological operators can be used.

The modulation G of a film or a camera to a light intensity I and thereby to a gray value is usually not linear but obeys a power function of the form $G=I^\gamma$. By changing the gamma value the intensity distribution of the image can be transformed non-linearly. Values for $\gamma$ can be set either manually and after visual inspection or automatically. One example for a gamma correction is the correction of the well-known characteristic curves of several image processing and display hardware devices (e.g., monitor gamma, scanner gamma).

In the following block 3 of the flow chart shown in FIG. 1 is described.

It is the object of the segmentation to separate the individual objects of a scene from each other and from the background. For this, common methods for the segmentation of objects can be used, however, advantageously specific methods for the segmentation of faces may be employed.

In the common methods different approaches have been approved as, e.g., thresholding, multi spectral thresholding, but also pixel classification and optimization methods that aim at segmentation by relaxation.

Thresholding, e.g., is based on the fact that objects differ from the background by their gray values and is thus, employed almost exclusively in methods with controlled boundary conditions, in particular, with controlled illumination. For each pixel comparison with a threshold is performed and depending on the result of the comparison it is labeled as an object or background pixel.

In the specific methods for detection and segmentation of faces multi-step approaches are often used.

Prior to the detection a "de-rotation" of the suspected face area may be attempted. In this, one starts from the premise that a substantially frontal face is symmetric with respect to the nose. Determination of the symmetry axis, e.g., by a cepstrum analysis, and subsequent de-rotation usually provide an area that possibly contains an upright face.

There have been proposed and used different methods for face detection. Details can be found in "Neural Network-Based Face Detection", Rowley et al., IEEE Trans. on Pattern Analysis and Machine Intelligence", Vol. 20, No. 1, pp. 23-38, 1998, and "Face Detection in Color Images", Jain et al., IEEE Trans. on Pattern Analysis and Machine Intelligence, Vol. 24, No. 5, pp. 696-706, 2002. Faces can be segmented, e.g., with the help of the establishment of thresholds, in a suitable color space. Other approaches, e.g., by Rowley, are based on the classification of a pyramidal transformation of the image area by neural classificators that have been trained by exemplary image data. A preferred method for the segmentation of a face employs the above-mentioned graph matching method or some supplementary version of this method (e.g., HGM).

Verifying features within the face region/background, which still is part of block 3, comprises:
- method for determining the positions of the eyes
- method for verifying the position of the head/face within the image (distance of the eyes to each other, distance to the edge of the image)
- method for determining the size of the head
- method for verifying and analyzing the head pose (fronto-parallel rotation; depth rotation/nodding movements)

In the following the individual methods are described in more detail.

Determining the positions of the eyes:

The positions of the eyes are usually of particular interest for evaluating the observation of a predetermined specification for an image. Determining the positions of the eyes is a problem that is known in image processing for along time and solution approaches of different complexities have been proposed:

Jain et al. (see above for reference) propose a method according to which the eyes are detected by the distribution of chrominance and luminance within the face based on an initial detection of the face. The original color distributions are subject to morphological operations and are subsequently detected by thresholding on an image pyramid.

Other methods are based on methods for comparing patterns either implicitly by neural classificators or explicitly by modeling and comparing the geometric features (e.g., by detecting the circles of the border of the pupil, the bows of the eyebrows, etc.).

Verifying the positions of the eyes within the image:

For a favorable positioning of the face within the image the distances of the eyes from the edges of the image can be used alternatively. The distances of the left eye from the upper and the lower edges of the image are detected in terms of pixels and compared with predetermined thresholds. Similar measurements are performed for the right eye. By empirical investigations threshold values of about 40 pixels for the distance of each eye from the corresponding edge of the image and of about 80 pixels for the distances of the eye axis from the lower and upper edge of the image have been approved.

Verifying the distance of the eyes to each other:

Subsequent to the detection of the positions of the eyes the distance between these positions is detected and compared with a predetermined threshold. A distance of at least 50 pixels between the centers of the eyes have been proven to be advantageous for the identification of persons.

Verifying the frontoparallel rotation:

Verifying the frontoparallel rotation of a portrait is performed by calculating the rotation angle of the face with respect to a normal axis. This rotation angle can be calculated for known positions of the centers of the eyes by detecting the projected distance of the eyes in the x- and y-directions and by employing respective trigonometric relations. Since an accurate detection of the centers of the eyes is often problematic, e.g., due to image perturbations, alternatively or in addition, the following more stable method can be performed:

1. Generating a translational invariant representation of the image that, however, still includes rotational information. This is, e.g., given by the absolute value of the Fourier transform of the image.
2. Generating a translational invariant representation of the mirrored image.
3. Measuring the displacement of the rotation angle in this representation, e.g., by a transformation to polar coordinates and measurement of the displacement along the angle, e.g., by methods based on correlations.

For verifying the image quality the calculated rotation angle is compared with predetermined thresholds. Where appropriate the image can be rotated by a corresponding linear image operation such that the resulting image is no longer rotated or lies within predetermined thresholds.

Verifying the depth rotation:

The relative rotation in space (fundamental matrix/essential matrix) can be determined from a set of point correspondences (of 8 or more pairs of points) between the image and a model with the help of a method that is known in the literature as the 8-point-algorithm.

References for the latter mentioned methods are: "Complete Dense Estimation using Level Set Methods", O. Faugeras and A. Keriven, European Conference on Computer Vision, 1998; and "The Fundamental Matrix: Theory, Algorithms and Stability Analysis", Q. T. Luong and O. Faugeras, 1995.

The compensation of the depth rotation may be performed, e.g., by adaptation of the parameters of a 3D head model on which the color or gray values of the given face, respectively, are projected. The thus calculated 3D model of the image is subsequently de-rotated, preferably to a normalized view, by the previously determined rotation parameters.

In the case of the depth rotation also the calculated rotation angles are compared with predetermined thresholds for verifying the image-quality. Where appropriate the image can be transformed by the above-described method such that the resulting image is no longer rotated or lies within the predetermined thresholds again.

Besides the optimum image of the head/face area the background is also of relevance for optimized image recognition. Therefore, passport photographs typically have to obey the conditions of a uniform, homogenously colored background. Subsequent to object localization and object segmentation (i.e. of the head or of the face) the background ("residual image") can be analyzed by the already described methods with respect to brightness (average brightness, variance), contrast, color and texture. If typical threshold values are exceeded, unsuitable images, i.e. images showing backgrounds that are considered as being inhomogenous or dominant by a viewer, can be rejected or can be subject to a correction method for replacing the background by a more suitable one by means of electronic image manipulation. For a pixel-by-pixel replacement backgrounds showing constant brightness and colors can advantageously be chosen.

If the object background that is visible in the image does not fulfill the verification criteria, this background can be replaced by another one that observes the verification criteria by methods of image manipulation. This is realized by overwriting pixel-by-pixel the area that has been marked as image background area during the segmentation process at which, in the simplest case, a constant color and brightness are assigned to each pixel. The selection of a suitable background color and brightness may advantageously be carried out by also taking into account the considered object itself in order to optimize the difference in contrast between the object and the background.

In the following block 4, i.e. verifying local criteria of the head/face region, is described.

First, the verification of the image area with respect to completeness, e.g., verification whether both eyes, the nose, the mouth portion are visible, whether the edges of the face surpass the image, (segmentation completely within the image) has to be mentioned.

To verify whether all of the substantial parts of the face are visible a method based on, e.g., a graph matching method (e.g., HGM), may be preferred. Subsequent to the matching and placing of the knots based on the overall evaluation of the graph and thus, not significantly influenced by perturbations similarities of local knots or groups of knots can be evaluated. This is done by either verifying whether the similarities to model knots (e.g., in form of examples) are sufficiently high or explicitly by classifying in the considered positive case and the corresponding negative case (e.g., similarity to "normal" opened eye, closed eye, eye patch).

In addition, it can be verified by comparison of the maxima and minima of the coordinates of the positioned graph with the dimensions of the image whether (a) the face is completely present in the image and (b) the size and position of the face observe quality standards within predetermined tolerable deviations.

In specific cases it can be useful to detect worn eyeglasses separately. For example, it might be possible that the quality standards only allow for images without eyeglasses only.

A possible method for this is the method of bunch graph matching with annotated graphs first described by L. Wiskott: "Face recognition and gender determination", L. Wiskott et al., International Workshop on Automatic Face-and-Gesture-Recognition, pp. 92-97, Zurich, 26.-28. 06. 1995. According to this method subsequent to the positioning of the graph it is verified which knot of the graph stack resembles most the knot of the current graph. If the graph stack has been previously annotated, e.g., in the way that the corresponding image shows a person wearing eyeglasses, this annotation is also assigned to the current knot. By a final evaluation of the annotations of all current knots (e.g., by majority vote) one can judge that eyeglasses are worn or not in the image.

Of particular importance is the verification—and where appropriate the manipulation—of the region of the eyes.

An approach for discriminating between closed and opened eyes has already been sketched above. Subsequent to the positioning of the graph it is, in particular, readily possible to recognize the "red eye" problem that occurs due to the usage of flash lights by evaluation of the color information at the positions of the eye knots. Moreover, correction by a modification of the color information in the corresponding regions is feasable.

For the verification of the mouth region substantially the same holds as what was said about the region of the eyes. In addition, however, there evaluating the deviations of the current knot positions from the positions of corresponding knots of reference models is feasable, e.g., by using the sum of the absolute values of all positional deviations with respect to a reference knot in the case of an opened or closed mouth, respectively. In the simplest case, the decision can be drawn by a comparison with some threshold.

Verification of the presence of a headgear can be performed according to the following pragmatic approach: Subsequent to the successful positioning of the graph the knots that describe the upper head edge can be evaluated. Verification with respect to color and shape can be preferred. The first can be done by analysis of the original image, the latter by evaluating the similarity with model images. If significant deviations are present in one of the both cases, some headgear might be present. Such images should be subject to visual inspection by a human operator (→block 6).

In the following reference is made to block 5 (image correction), in so far as the corresponding methods have not previously been used and described in one of the preceding blocks 2 to 4.

In particular, methods for contrast, brightness and color correction in the head/face area are to be mentioned. In addition to already mentioned correction methods ("manipulation methods") here, corrections are not carried out globally but rather restricted to the head/face area. The above-mentioned adaptation methods based on histograms or color space transformations are accordingly to be applied to these areas obtained by segmentation.

Finally, reference is made to block 6 of FIG. 1.

Subsequent to performance of the above-mentioned methods it has to be signalized to a user whether the image (or where appropriate the corrected image) that is subject to the verification method observes the predetermined quality standards. If so, the image (or where appropriate the corrected image), e.g., can be stored to a database, transmitted on an identity document, etc.

The method exemplified with the help of the figure serves for illustration purposes of the principles on which the invention is based only. The scope of protection of the invention is defined by the appended claims.

The invention claimed is:

1. A computer-implemented method for determining the suitability of a digitized image of a person for person identification, with the steps:
   segmenting the image of a person into a background area and a head or face area,
   analyzing the head or face area to determine at least one geometric feature and at least one reproduction feature,
   comparing the at least one geometric feature and the at least one reproduction feature with at least one predetermined threshold value,
   making a determination of the suitability of the image based on a result of the comparison,
   performing image correction when the determination of the suitability results is an image that does not fulfill one or more quality criteria,
   wherein the image correction comprises:
      correcting at least one image reproduction feature in the entire image and/or the head or face area and/or the background area, correcting at least one geometric feature of a head or face area displayed in the image of a person,
   wherein the at least one geometric feature comprises a size and/or shape and/or position and/or spatial orientation of the head or face area within the image of a person, and
   wherein the at least one reproduction feature comprises a contrast and/or a color distribution and/or a sharpness of the image and/or a brightness and/or a grade of staining and/or a measure for the irradiation of the head or face area.

2. Method according to claim 1, wherein the step of segmenting comprises performing a method for object recognition.

3. Method according to claim 1, wherein analyzing the head or face area comprises localizing sub-regions of the head or face area.

4. Method according to claim 3 with the additional step: analyzing the at least one localized sub-region.

5. Method according to claim 1 with the step: analyzing the image of a person with respect to global criteria that apply to the entire image of a person.

6. Method according to claim 1 with the step: analyzing the background area of the image of a person.

7. Method according to claim 1 with the step: determining whether a negatively evaluated image could fulfill the predetermined quality criteria after image correction.

8. A data processor, adapted to execute a method according to claim 1.

9. System for quality determination and correction of digitized images of persons, comprising
   storage means for storing digitized image data, and one of first data processing means for executing the steps of segmenting, analyzing, comparing, and making a determination of suitability according to the method of claim 1, and second data processing means for executing the step of performing image correction according to the method of claim 1, and
   data processing means for executing the method according to claim 1.

10. A system according to claim 9 comprising an apparatus for generating digitized image data.

11. A system according to claim 9 comprising a display device for displaying whether a verified image or a modified image observes predetermined quality standards.

* * * * *